UNITED STATES PATENT OFFICE.

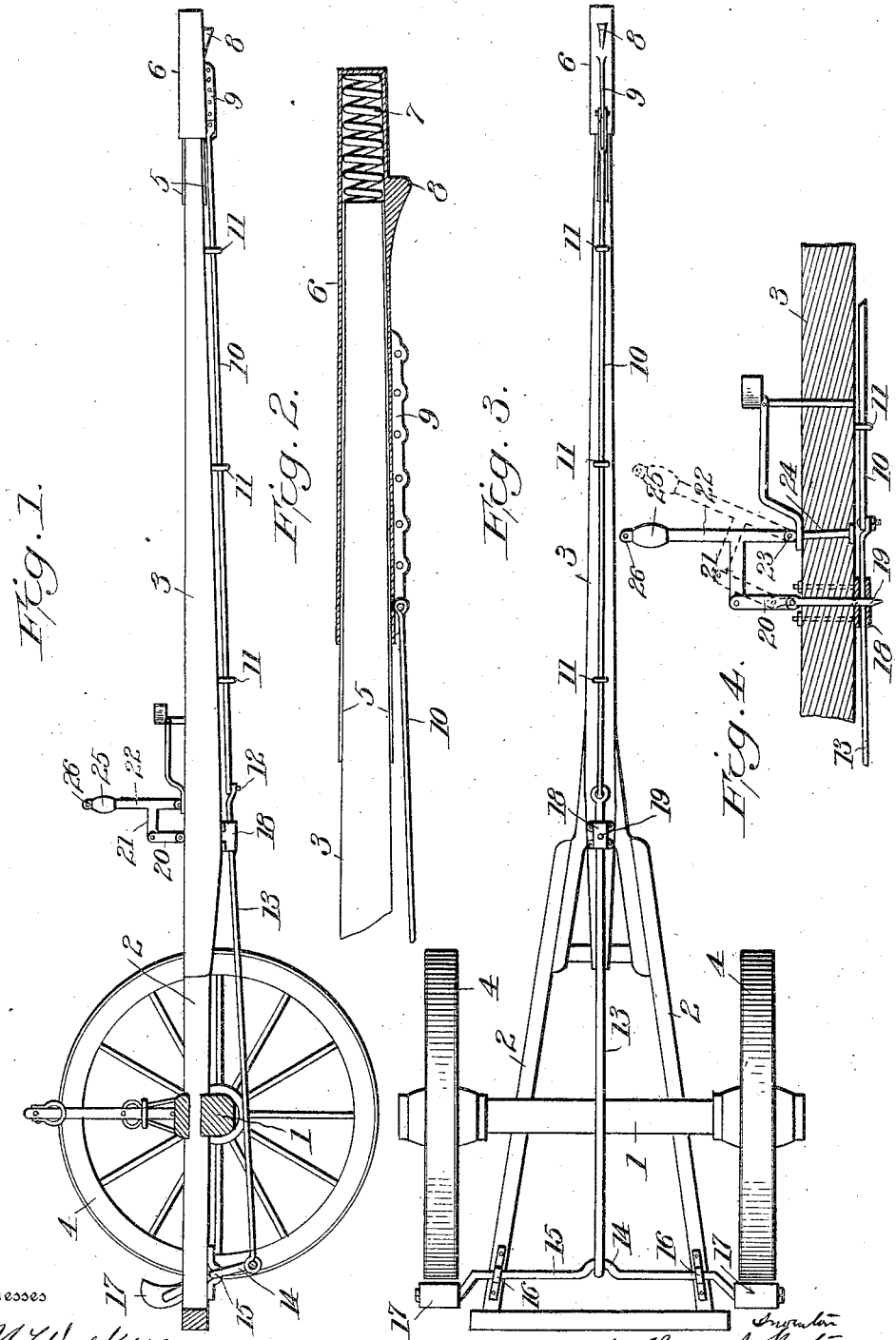

WILLIAM J. WATSON, OF EVART, MICHIGAN.

VEHICLE-BRAKE.

No. 877,971.

Specification of Letters Patent.

Patented Feb. 4, 1908.

Application filed June 29, 1907. Serial No. 381,527.

*To all whom it may concern:*

Be it known that I, WILLIAM J. WATSON, a citizen of the United States, residing at Evart, in the county of Osceola and State of Michigan, have invented certain new and useful Improvements in Vehicle-Brakes, of which the following is a specification.

This invention relates to automatic brakes for vehicles.

One object of the invention is to provide a brake adapted for automatic operation to brake the wheels upon backing of the team or when the vehicle is going down a grade.

Another object of the invention resides in the provision of a brake of the nature stated embodying such characteristics that the vehicle will be braked to prevent crowding of the vehicle upon the team when going down a grade and provided with means adapted to throw the braking mechanism out of operation if desired to overcome braking of the vehicle when going down a grade and particularly when backing a vehicle.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings:—Figure 1 is a side elevation of my invention; Fig. 2 is a longitudinal sectional view of portion of the invention; Fig. 3 is an inverted plan view; and Fig. 4 is a view illustrating the means for holding the braking mechanism out of operation, the dotted lines indicating the position of said means when the braking mechanism is operative.

Referring now more particularly to the accompanying drawings, and letting it be understood at the outset that my improved brake is applicable to the running gear of any ordinary farm or other vehicle, the reference character 1 indicates an axle, 2 axle hounds, 3 the draft tongue secured in the usual manner to the axle hounds, and 4 the forward wheels of the vehicle, all of these parts being of ordinary type.

Fixedly secured to the outer end of the draft tongue 3 are plates 5 adapted to prevent undue wear of the draft tongue by reason of a slidable movement of the sleeve 6 upon the tongue. Disposed within the sleeve 6 between the closed outer end of the latter and the outer end of the draft tongue is a helical spring 7 designed to force the sleeve 6 forwardly of the tongue. This sleeve 6 is provided with a depending lug 8, against which the ring on the neck yoke bears, and in the rear of this lug 8 it is provided with a depending longitudinal perforated lug 9, perforations in the lug 9 being provided to permit of an adjustable connection with the lug 9 of the section 10 of the brake rod, which section 10 is supported upon draft tongue 3 by the staples or other suitable elements 11. The inner end 12 of this section 10 of the brake rod is directed downwardly into an eye in the inner end of the section 13 of the brake rod. The section 13 of the brake rod is connected at its outer end to the intermediate bend 14 of the brake beam 15 rotatably mounted in suitable bearings 16 upon the axle hounds 2 and provided at each end with a brake shoe 17 arranged in alinement with corresponding wheels 4 for braking purposes. The inner end of the section 13 of the brake rod is slidably supported in the guide 18 secured to the under face of the tongue 3 at the inner end of the latter.

From the foregoing it will be understood that the brake shoes 17 are normally in released positions incident to the outward thrust of the sleeve 6 by the spring 7. The vehicle upon going down a grade would prompt the draft animal to pull backwardly or there might be a crowding of the vehicle upon the draft animal due to the grade of the roadway, and in either event the sleeve 6 would be moved inwardly upon the draft tongue 3 against the action of the spring 7, causing the brake rod, which is made up of the sections 10 and 13, to slide rearwardly of the vehicle, causing the cranked formation of the brake beam to rotate in its bearings 16 and apply the brake shoes 17 to the wheels 4, thereby braking the vehicle, to prevent too rapid a decent or crowding of the animals by the vehicle.

There may be times when it would be desired to permit of a rapid descent of the vehicle upon a down grade, especially to permit of a backing of a vehicle without the application of the brake to the wheels. For such purposes, I provide a locking bolt 19 which works through alining perforations in the draft tongue 3, the guide 18, and the section 13 of the brake rod, as clearly shown in Fig.

4. These three elements may be moved to bring their perforations into alinement for the reception of the locking bolt 19, when the brake rod would be locked against movement to prevent operation of the brake. This locking bolt 19 has pivoted to its upper end a link 20 which is pivotally secured at its outer end to the arm 21 of the lever 22. The arm 21 is preferably arranged intermediate the ends of the lever 22 and the latter has its lower end pivoted in the ears 23 of the bolt 24, the latter being fitted in the draft tongue 3. To hold the lever 22 normally in such position as to hold the locking bolt 19 out of locking position, I provide the upper end of the lever 22 with a weight 25 adapted to hold the locking means in the position shown in dotted lines in Fig. 4. The lever 22 has an eye 26 in its upper end above the weight 25 to receive a cord, wire, chain or other connection (not shown), so that the locking means may be thrown into operative position by the occupant of the vehicle without necessitating the latter leaving his seat. Thus it will be seen that I provide an exceedingly simple and inexpensive, durable and efficient braking mechanism applicable to any type of vehicle and that the structure of the mechanism is such as to insure a positive automatic operation when desired.

What is claimed is:—

1. In an autoRatic vehicle brake, the combination with the running gear of the vehicle including a draft tongue, of a brake beam, a sleeve slidably mounted upon the draft tongue, said sleeve having a depending lug, a spring confined within the sleeve, a two-part brake rod connecting the depending lug and the brake beam, a guide secured to the under face of the tongue for the support and guidance of the brake rod, the tongue, the brake rod and said guide being each provided with a perforation, a locking bolt arranged for insertion in the perforations of the tongue, the brake rod and the guide to hold the brake mechanism out of operation, a lever pivotally mounted upon the tongue and provided with an arm intermediate its ends, and a link connection between said arm and said bolt.

2. In an automatic vehicle brake, the combination with the running gear of the vehicle including a draft tongue, of a brake beam, a sleeve slidably mounted upon the outer end of the draft tongue, said sleeve having a depending lug provided with a series of perforations, a spring confined within the sleeve, a brake rod connection having interchangeable engagement in the perforations of said lug, guides secured to the under face of the tongue for the support and guidance of the brake rod connection, the tongue, the brake rod connection and one of said guides being each provided with a perforation, a locking bolt arranged for insertion in the perforations of the tongue, said guide and the brake rod connection to hold the brake mechanism out of operation, a weighted lever pivotally mounted upon the tongue, and provided intermediate its ends with an arm, and a link connection between said arm and said locking bolt whereby the latter may be thrown into and out of locking position.

3. In an automatic vehicle brake, the combination with the running-gear of the vehicle including a draft tongue, of a brake beam, a spring controlled sleeve mounted upon the outer end of the draft beam, a locking bolt arranged for engagement with the brake rod connection to hold the latter out of operative position, a lever pivotally mounted upon the tongue and provided intermediate its ends with a rearwardly directed arm, and a pivoted link connection between said arm and bolt whereby the locking bolt may be thrown into and out of operative position.

4. In an automatic vehicle brake, the combination with the running-gear of the vehicle including a draft tongue, of a brake beam, a spring controlled sleeve mounted upon the outer end of the draft tongue, a locking bolt arranged for engagement with the brake rod connection to hold the latter out of operative position, a lever pivotally mounted upon the tongue and provided intermediate its ends with an arm, and a link connection between said arm and bolt whereby the locking bolt may be thrown into and out of operative position, said lever being weighted at its outer end whereby the locking bolt may be held normally out of locking position.

In testimony whereof I affix my signature in presence of two witnesses.

WILLIAM J. WATSON.

Witnesses:
 GEO. A. GLERUM,
 RUTH E. BOWLEY.